United States Patent
Yu et al.

(10) Patent No.: US 10,425,383 B2
(45) Date of Patent: *Sep. 24, 2019

(54) PLATFORMS FOR IMPLEMENTING AN ANALYTICS FRAMEWORK FOR DNS SECURITY

(71) Applicant: Infoblox Inc., Santa Clara, CA (US)

(72) Inventors: Bin Yu, Pleasanton, CA (US); Les Smith, Pleasanton, CA (US); Mark Threefoot, Sunnyvale, CA (US)

(73) Assignee: Infoblox Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/696,023

(22) Filed: Sep. 5, 2017

(65) Prior Publication Data
US 2018/0091479 A1    Mar. 29, 2018

Related U.S. Application Data

(63) Continuation of application No. 15/143,210, filed on Apr. 29, 2016, now Pat. No. 9,787,642, which is a continuation of application No. 14/257,902, filed on Apr. 21, 2014, now Pat. No. 9,363,282.

(60) Provisional application No. 61/932,475, filed on Jan. 28, 2014.

(51) Int. Cl.
*H04L 29/06* (2006.01)
*H04L 29/12* (2006.01)

(52) U.S. Cl.
CPC ...... *H04L 63/0263* (2013.01); *H04L 61/1511* (2013.01); *H04L 63/0218* (2013.01); *H04L 63/1425* (2013.01); *H04L 63/1441* (2013.01); *H04L 2463/144* (2013.01)

(58) Field of Classification Search
CPC .................. H04L 61/1511; H04L 2463/144
See application file for complete search history.

(56) References Cited

U.S. PATENT DOCUMENTS

| | | | | |
|---|---|---|---|---|
| 7,634,808 B1 * | 12/2009 | Szor | ................... | H04L 63/1416 709/223 |
| 8,260,914 B1 * | 9/2012 | Ranjan | ................ | H04L 61/1511 709/224 |
| 8,539,577 B1 * | 9/2013 | Stewart | ............. | H04L 29/12066 726/22 |

(Continued)

OTHER PUBLICATIONS

Afonso et al., Enhancing DNS Security using Dynamic Firewalling with Network Sensors; ICSNC 2011: The Sixth International Conference on Systems and Networks Communications; 2011.

(Continued)

*Primary Examiner* — James R Turchen
(74) *Attorney, Agent, or Firm* — Van Pelt, Yi & James LLP

(57) ABSTRACT

Flux domain is generally an active threat vector, and flux domain behaviors are continually changing in an attempt to evade existing detection measures. Accordingly, new and improved techniques are disclosed for flux domain detection. In some embodiments, an online platform implementing an analytics framework for DNS security is provided for facilitating flux domain detection. For example, the online platform can implement an analytics framework for DNS security based on passive DNS traffic analysis, disclosed herein with respect to various embodiments.

20 Claims, 11 Drawing Sheets

(56) References Cited

U.S. PATENT DOCUMENTS

| | | | | |
|---|---|---|---|---|
| 8,561,188 B1* | 10/2013 | Wang | H04L 63/1425 | 713/176 |
| 8,904,524 B1* | 12/2014 | Hodgman | G06F 21/56 | 726/22 |
| 8,938,800 B2* | 1/2015 | Bhargava | H04L 63/02 | 726/22 |
| 2010/0235915 A1* | 9/2010 | Merron | H04L 63/145 | 726/23 |
| 2011/0191455 A1* | 8/2011 | Gardner | H04L 29/12066 | 709/223 |
| 2012/0042381 A1* | 2/2012 | Antonakakis | H04L 61/1511 | 726/22 |
| 2012/0054869 A1* | 3/2012 | Yen | H04L 29/12066 | 726/24 |
| 2012/0084860 A1* | 4/2012 | Cao | H04L 63/1441 | 726/23 |
| 2012/0158626 A1* | 6/2012 | Zhu | G06F 21/56 | 706/13 |
| 2012/0304244 A1* | 11/2012 | Xie | G06F 21/00 | 726/1 |
| 2013/0014253 A1* | 1/2013 | Neou | H04L 63/1441 | 726/22 |
| 2013/0232574 A1* | 9/2013 | Carothers | G06F 21/56 | 726/22 |
| 2014/0007238 A1* | 1/2014 | Magee | G06F 21/577 | 726/24 |
| 2014/0040279 A1* | 2/2014 | Beygelzimer | H04L 43/026 | 707/748 |
| 2014/0075558 A1* | 3/2014 | Ward | H04L 63/1425 | 726/23 |
| 2015/0082431 A1* | 3/2015 | Davis | H04L 63/1425 | 726/23 |
| 2015/0195299 A1* | 7/2015 | Zoldi | H04L 63/1433 | 726/25 |

OTHER PUBLICATIONS

Antonakakis et al., "Building a Dynamic Reputation System for DNS", Proceedings of the 19th USENIX Conference on Security, 2010.

Antonakakis et al., "Detecting Malware Domains at the Upper DNS Hierarchy", Proceedings of the 20th USENIX Conference on Security, 2011.

Author Unknown, "Alexa", Alexa Internet, Inc., http://www.alexa.com/., 2014.

Author Unknown, "Apache Kafka", https://kafka.apache.org/, 2014.

Author Unknown, "FSI", Farsight Security, Inc., https://www.farsightsecurity.com/, 2014.

Author Unknown, "SAC 025 SSAC Advisory on Fast Flux Hosting and DNS", ICANN Security and Stability Advisory Committee, Version 1.0, 2008.

Author Unknown, "Storm", http://storm-project.net/, 2014.

Author Unknown, "Welcome to Apache Hadoop!", http://hadoop.apache.org/, Jan. 22, 2014.

Author Unknown, "Welcome to Apache HBase", http://hbase.apache.org/, 2014.

Author Unknown, ISC Security Information Exchange http://www.isc.org/, 2014.

Author Unknown, The Honeynet Project, "Know Your Enemy: Fast-flux Service Networks", http://old.honeynet.org/papers/ff/fast-flux.html , 2007.

Bilge et al., "Exposure: Finding Malicious Domains Using Passive DNS Analysis", Proceedings of the ISOC Network and Distributed System Security Symposium, 2011.

Chang et al., "Bigtable: A Distributed Storage System for Structured Data", Google, Inc., 2006.

Frosch, Mining DNS-related Data for Suspicious Features; Dec. 23, 2011; Ruhr-Universitat Bochum.

Holz et al. "Measuring and Detecting Fast-flux Service Networks", Proceedings of the Network & Distributed System Security Symposium, 2008.

Hsu et al., "Fast-flux Bot Detection in Real Time", Proceedings of the 13th International Conference on Recent Advances in Intrusion Detection, 2010.

Hu et al., RB-seeker: Auto-detection of Redirection Botnets, Annual Network & Distributed System Security Symposium, 2009.

Konte et al., "Dynamics of Online Scam Hosting Infrastructure", Proceedings of Passive and Active Measurement Conference, 2009.

Nazario et al. "As the Net Churns: Fast-flux Botnet Observations", Proceedings of the 3rd International Conference on Malicious and Unwanted Software, 2008.

Passerini et al., FluXOR: detecting and monitoring fast-flux service networks; Proceedings of the 5th International Conference on Detection of Intrusions and Malware, and Vulnerability Assessment; 2008.

Perdisci et al., "Early Detection of Malicious Flux Networks via Large-Scale Passive DNS Traffic Analysis", IEEE Transactions on Dependable and Secure Computing, vol. 9 No. 5, pp. 714-726, 2012.

Perdisci et al., Detecting Malicious Flux Service Networks through Passive Analysis of Recursive DNS Traces; Annual Computer Security Applications Conference; IEEE; Dec. 7-11, 2009.

Stalmans et al., A Framework for DNS Based Detection and Mitigation of Malware Infections on a Network; IEEE; 2011.

Stalmans et al., Geo-Spatial Autocorrelation as a Metric for the Detection of Fast-Flux Botnet Domains; IEEE 2012.

* cited by examiner

PLATFORMS FOR IMPLEMENTING AN ANALYTICS FRAMEWORK FOR DNS SECURITY

CROSS REFERENCE TO OTHER APPLICATIONS

This application is a continuation of co-pending U.S. patent application Ser. No. 15/143,210, entitled PLATFORMS FOR IMPLEMENTING AN ANALYTICS FRAMEWORK FOR DNS SECURITY filed Apr. 29, 2016 which is incorporated herein by reference for all purposes, which is a continuation of U.S. patent application Ser. No. 14/257,902, now U.S. Pat. No. 9,363,282, entitled PLATFORMS FOR IMPLEMENTING AN ANALYTICS FRAMEWORK FOR DNS SECURITY, filed Apr. 21, 2014, which claims priority to U.S. Provisional Patent Application No. 61/932,475, entitled SEMI-SUPERVISED TIME SERIES MODELING FOR REAL-TIME FLUX DOMAIN DETECTION ON PASSIVE DNS TRAFFIC, filed Jan. 28, 2014, both of which are incorporated herein by reference for all purposes.

BACKGROUND OF THE INVENTION

Flux domain, also referred to as fast flux and domain flux, is often used as an evasion technique that cyber-criminals and Internet miscreants use to evade identification and to frustrate law enforcement and anti-cybercrime efforts aimed at locating and shutting down web sites used for illegal or other improper or unauthorized purposes.

In a flux network, nodes (e.g., typically systems compromised by malware) are used as proxy servers pointed to by a flux domain through a DNS server. This allows for very rapid changes to DNS related data, which helps cyber-criminals and miscreants delay or evade detection and mitigation of their activities. The main purpose of domain flux is generally to hide true delivery sites used by, for example, malware and/or cybercriminal/scam operators, behind a vast number of relatively short lived Internet Protocol (IP) addresses that are swapped in and out of a DNS record for a domain. This is often referred to as single-flux. However, the same mechanism can be applied to a DNS name server, which is referred to as double-flux.

BRIEF DESCRIPTION OF THE DRAWINGS

Various embodiments of the invention are disclosed in the following detailed description and the accompanying drawings.

DETAILED DESCRIPTION

Figure 1:
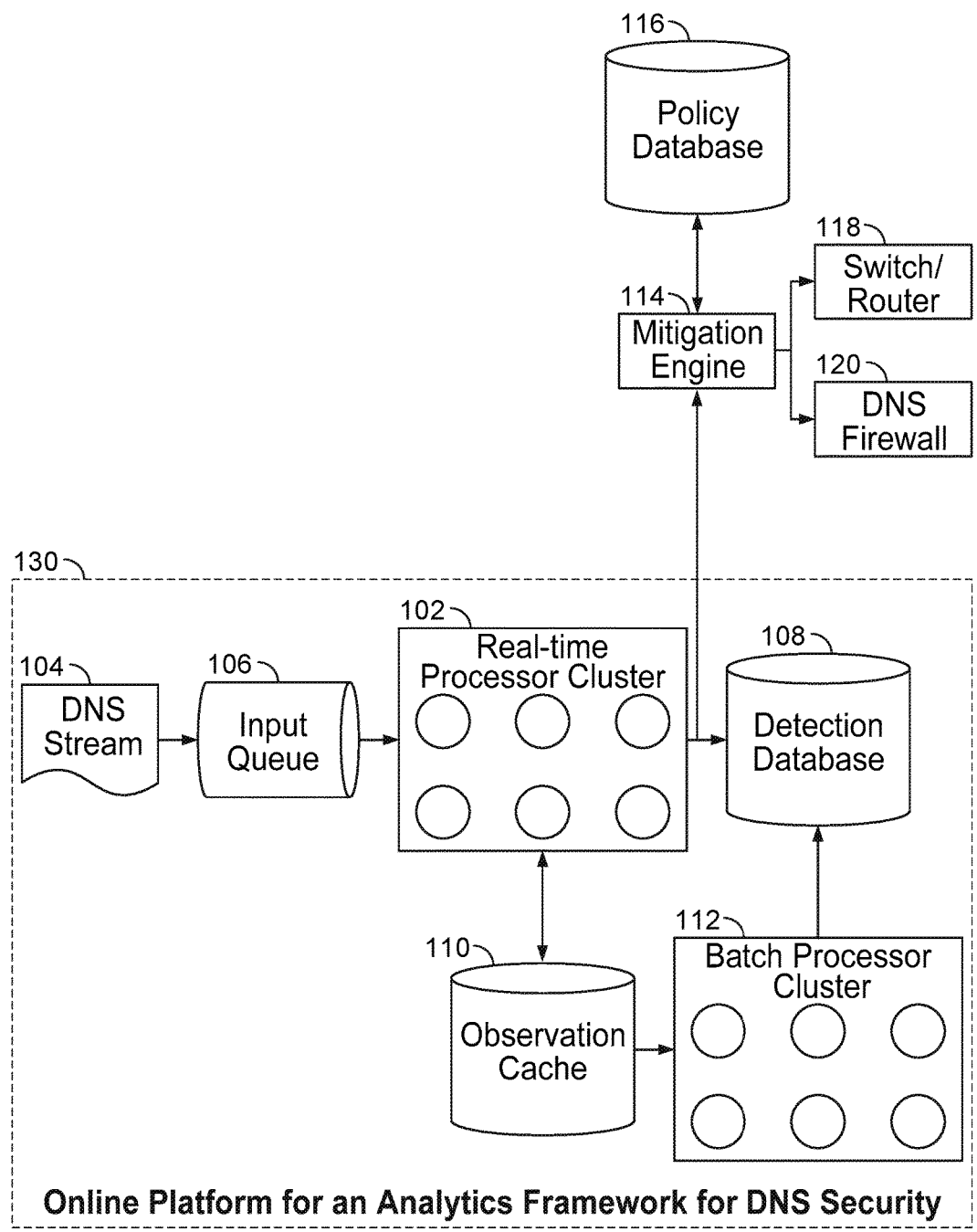
FIG. 1 is a functional block diagram illustrating an architecture for providing an online platform implementing an analytics framework for DNS security based on passive DNS traffic analysis in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Flux domain, also referred to as fast flux and domain flux, is often used as an evasion technique that cyber-criminals and Internet miscreants use to evade identification and to frustrate law enforcement and anti-cybercrime efforts aimed at locating and shutting down web sites used for illegal or other improper or unauthorized purposes.

In a flux network, nodes (e.g., typically systems compromised by malware) are used as proxy servers pointed to by a flux domain through a DNS server. This allows for rapid changes to DNS related data, which helps cyber-criminals and miscreants delay or evade detection and mitigation of their activities. The main purpose of domain flux is generally to hide true delivery sites used by, for example, malware and/or cybercriminal/scam operators, behind a vast number of, and typically relatively short lived, Internet Protocol (IP) addresses that are swapped in and out of a DNS record for a domain. This is often referred to as single-flux. However, the same mechanism can be applied to a DNS name server, which is often referred to as double-flux.

Generally, flux domain approaches are implemented by having numerous IP addresses associated with a single Fully Qualified Domain Name (FQDN), where the IP addresses are swapped in and out (e.g., flux domain approaches typically would perform such swapping in and out of IP addresses with a high frequency) through changing DNS records. Such flux domain approaches are often used in botnet (e.g., Command and Control (C&C) botnet related activities) and/or phishing attacks linked to various cybercriminal activities or cybercriminal organizations.

In particular, single-flux is a simplest type of flux domain approach. Single-flux is generally characterized by multiple individual nodes within the network registering and de-registering their addresses as part of the DNS A (address) record list for a single DNS name with short Time-To-Live (TTL) values (e.g., often less than five minutes or some other relatively short time interval) to generate a constantly changing list of destination addresses (e.g., destination IP addresses) for that single DNS name (e.g., network domain or network domain name). In some cases, the list of destination addresses for that single DNS name can be hundreds or thousands of entries long.

The above-mentioned double-flux is a more sophisticated type of flux domain approach. Double-flux is generally characterized by multiple nodes within the network registering and de-registering their addresses as part of the DNS name server record list for the DNS zone. As a result, this approach provides an additional layer of redundancy and survivability within a malware network.

Within a typical malware attack using a flux domain approach (e.g., botnet attack or other form of malware attack), the DNS records will normally point to a compromised node (e.g., a host, such as a system, appliance, or other network device) that will act as a proxy server. This approach can evade typical anti-malware techniques, such as IP-based Access Control Lists (ACLs), which can block network access based on IP addresses (e.g., known bad IP addresses, such as IP addresses known to be associated with malware). This approach can also mask the nodes of attackers, which will exploit the network through such a series of proxies to thereby make it even more difficult to identify the attacker's malware network. For example, using this approach in a botnet attack, the record will normally point to an IP where bots go for registration, to receive instructions, and/or to activate attacks. Because the IPs are behind a proxy server, this provides for an anonymous proxy server function that can effectively conceal the originating source of these instructions, which allows for evasion of typical anti-malware techniques, such as IP-based ACLs as discussed above.

As such, flux domain is generally a DNS technique used by malware, such as by botnets to hide phishing and malware delivery sites, behind an ever-changing network of compromised nodes that can be acting as proxies. Domain flux can also be used to refer to the combination of peer-to-peer networking, distributed command and control, web-based load balancing, and/or proxy redirection used to make malware networks more resistant to discovery and anti-malware techniques.

For example, flux domain is an example of a DNS technique that is being used for bad activities that include distributing malware, stealing data, bypassing authority checks, accessing command and control (e.g., botnets), and/or other unauthorized, undesirable, inappropriate, and/or malicious activities. Existing rule-based DNS firewall techniques are generally not adaptive and effective to detect such advanced persistent threats and/or to provide zero-day detection of such new and/or evolving flux domains.

Flux domain generally exploits the stability and resilience of the DNS to make it difficult to eliminate nodes being used for such malware or cybercriminal activities. As a result, flux domain approaches can frustrate both administrative remedies and technical remedies. While flux domain is generally not a threat to any component of the DNS infrastructure, flux domain can be a threat to Internet users that are facilitated by DNS.

Over the years since the first domain flux was identified in the early 2000's time frame, attackers have changed and evolved the behavior of flux domain approaches to evade detection by existing anti-malware techniques. For example, some of the new flux domain approaches are effectively no longer fast flux. As a result, the simple TTL filtering methods can often fail, because some flux domain-based attacks are not really fast changing their DNS records. Instead, the DNS records can have TTL values set to values that would exceed typical TTL value thresholds (e.g., often on the order of minutes, such as 300 seconds, which is equal to five minutes, or some other value) used by TTL filtering methods, for example, by having TTL values that can be set to be equal to values as long as several hours or days. Also, many legitimate domains can be used for load balancing, such as Content Delivery Network (CDN) and Network Time Protocol (NTP) services, which can have behaviors that are similar in certain aspects to behaviors associated with various evolving flux domain approaches.

Various approaches exist for attempting to detect potential flux domains. For example, some approaches attempt to identify potential flux domains in the URLs found in the body of spam emails that are typically captured by spam traps and filters. Other approaches attempt to analyze Net-Flow information collected at border routers to identify redirection botnets. Another approach proposes providing a real-time system for detecting flux domains based on anomalous delays in hypertext transfer protocol (HTTP)/hypertext transfer protocol secure (HTTPS) requests from a given client. Yet another approach proposes providing a fast flux detection system that is focused on passive analysis of DNS traffic. Common to such approaches is that they generally purport to identify flux domains based on the perceived common characteristics of flux domains, including the following: (a) short TTL values; (b) high frequency of change of the set of resolved IP addresses returned at each query; (c) the overall set of resolved IP addresses obtained by querying the same domain name over the time often being very large; and (d) the resolved IP addresses being scattered across many different networks. As another example existing approach, DNS reputation systems propose attempting to detect generic malicious domains and/or malware-specific domains by using large-scale DNS monitoring to attempt to detect malicious domains.

However, existing approaches for detecting flux domains are inadequate. In particular, existing approaches for detecting flux domains are inadequate as they can fail to identify flux domains (e.g., based on TTL value thresholds applied by TTL filtering methods, as some flux domains are now using longer TTL values that can exceed such typical TTL value thresholds), and/or they can lead to false positives (e.g., improperly identifying CDNs or NTPs as flux domains based on behavioral analysis). For example, botnets are changing the characteristics so that an increasing number of flux domains are no longer returning "short" lived IP addresses. In some cases, flux domains have been observed to use resolved IP address that can have a TTL value of up to one day (e.g., a TTL value equal to 86,400 seconds, which equals 24 hours or one day). As another example, the overall set of resolved IP addresses obtained by querying the same domain name over time can be a relatively low value (e.g., such as one or two, or some other low value). As yet another example, some legitimate network services, such as legitimate CDN, NTP server pools, Internet Relay Chat (IRC) server pools, and other legitimate network service, are served through sets of domain names that share some similarities (e.g., similar behaviors or characteristics) with fast-flux domains. As a result, certain existing approaches for detecting flux domains can result in false positives, in which such legitimate network services can be improperly identified as being flux domains. These and other examples illustrate some of the shortcomings of existing approaches for detecting flux domains.

Flux domain is generally an advanced persistent threat that is an active threat vector. In addition, flux domain behaviors are continually changing and evolving in an attempt to evade existing detection measures (e.g., existing signature-based approaches and/or existing flux domain detection techniques). Thus, new and improved techniques for detecting advanced persistent threats using flux domains are needed.

Accordingly, new and improved techniques are disclosed for flux domain detection. In some embodiments, an online platform implementing an analytics framework for DNS security is provided for facilitating flux domain detection. Techniques disclosed herein provide a new and more robust solution to DNS security with advanced analytics and/or machine learning techniques that can facilitate zero-day detection of flux domains.

For example, an online platform can implement an analytics framework for DNS security based on passive DNS traffic analysis (e.g., to identify domain flux based on one or more features) as further described herein with respect to various embodiments. In particular, the online platform can be implemented to support large throughput with real-time DNS streaming data processing with advanced analytics techniques. In some implementations, to differentiate the malicious flux domains from legitimate ones, such as CDN, NTP, and IRC services that can have similar behaviors, a time series model can be applied using a set of features that are focused on DNS TTL as well as on loyalty and entropy of DNS resource records. In some cases, an offline system can also be provided that can process big data (e.g., large amounts of data processing capacity) for applying one or more training model(s) in a semi-supervised mode to facilitate identification of one or more features that can be applied by the online platform for analyzing DNS data streams and identifying flux domains.

In some embodiments, an online platform implementing an analytics framework for DNS security based on passive DNS traffic analysis includes receiving a DNS data stream; processing the DNS data stream to identify a bad network domain based on a behavioral analysis model applied to a time series collection of passive DNS traffic data; and performing a mitigation action based on the identified bad network domain (e.g., in which a network domain is specified by a FQDN). For example, the bad network domain can be determined to be associated with a flux domain. In an example implementation, the DNS data stream can include DNS query and DNS response data.

In one embodiment, the online platform implementing an analytics framework for flux domain detection based on passive DNS traffic further includes determining a host is infected based on detecting a DNS query request to the bad network domain. In one embodiment, the online platform implementing an analytics framework for flux domain detection based on passive DNS traffic further includes performing a mitigation action based on the determined infected host. For example, the mitigation action can include one or more of the following: generating a firewall rule based on the bad network domain; configuring a network device to block network communications with the bad network domain; and quarantining an infected host, wherein the infected host is determined to be infected based on an association with the bad network domain (e.g., the infected host submitted a DNS query for the bad network domain). In some implementations, the mitigation action can include configuring a network device (e.g., a switch or router, implemented as a physical or virtual switch/router) to quarantine the infected host and/or block access to the bad network domain, using network access control or other mechanisms to quarantine the infected host and/or block access to the bad network domain, configuring a security device controller using Open Flow techniques to configure a network device (e.g., a switch or router, implemented as a physical or virtual switch/router) to quarantine the infected host and/or block access to the bad network domain, and/or to implement other configuration/programming techniques such as via API or publish/subscribe mechanisms to configure a network device (e.g., a switch or router, implemented as a physical or virtual switch/router) to quarantine the infected host and/or block access to the bad network domain.

In one embodiment, the online platform implementing an analytics framework for flux domain detection based on passive DNS traffic further includes identifying a source IP address, a source host, or attempting to query the bad network domain.

In one embodiment, the online platform implementing an analytics framework for flux domain detection based on passive DNS traffic further includes storing the time series collection of passive DNS traffic data in an observation cache.

In one embodiment, the online platform implementing an analytics framework for flux domain detection based on passive DNS traffic further includes receiving DNS data that is collected from an agent executed on a DNS appliance. For example, the agent can be configured to collect DNS data on the DNS appliance and to send the DNS data as a DNS data stream to the online platform implementing an analytics framework for domain detection based on passive DNS traffic. In an example implementation, the DNS data can be collected at one or more DNS appliances and sent to a real-time processor cluster of the online platform that can determine the bad network domain based on applying one or more behavioral models based on one or more features extracted from the passive DNS data traffic.

In one embodiment, the online platform implementing an analytics framework for flux domain detection based on passive DNS traffic further includes extracting a plurality of features from the DNS data stream to determine whether a network domain is associated with a flux domain (e.g., a fast flux domain) based on one or more of the extracted features. For example, one or more models based on DNS data feature extraction can be applied to determine whether a network domain is associated with a legitimate flux domain (e.g., CDN, NTP, or IRC services) and is not a suspicious or malicious flux domain.

In one embodiment, the online platform implementing an analytics framework for flux domain detection based on passive DNS traffic further includes applying a behavioral model based on extracted DNS data features to detect illegitimate flux domains (e.g., as opposed to using a simple blacklist comparison).

In some implementations, a feedback loop can be used to improve flux domain detection (e.g., by automatically adjusting thresholds for correlations, such as based on user feedback, analysis of additional processed DNS data, and/or improved training of the behavioral models, such as improved training performed using an offline platform as further discussed herein).

In one embodiment, the online platform implementing an analytics framework for flux domain detection based on passive DNS traffic further includes processing the DNS data stream using a real-time processor cluster. For example, the real-time processor cluster can implement one or more DNS-based behavioral models, such as an n-feature model (e.g., an example five-feature model as further described herein, or another number of extracted features can be implemented using a similar or different model) for flux domain detection.

In an example implementation, the real-time processor cluster is in communication with an observation cache (e.g., for storing time series data of a DNS data stream, including DNS data and meta data that can be extracted or calculated for the DNS data, and the observation cache can be implemented as a persistent, scalable cache). In some cases, the bad network domain detection results from the real-time processor cluster can be provided to a detection data store (e.g., a detection database) and/or to a mitigation engine for performing responsive actions (e.g., mitigation engine determined and requested actions).

For example, the online platform can be implemented using an appliance for flux domain detection on a network (e.g., deployed on an enterprise network for network security). As another example, the online platform can be implemented as a DNS cloud service for determining whether one or more network domains in a DNS data stream are associated with suspicious or malicious flux domain network activity.

In one embodiment, an online platform implementing an analytics framework for flux domain detection based on passive DNS traffic includes an online framework that can apply one or more models for detecting known and/or unknown malicious DNS queries or anomalies in a real-time stream of DNS data. As a DNS request is generally a first step for most network communications, these techniques can be implemented using the online platform to accurately identify malicious DNS query patterns and then effectively detect and block such network communication attempts between a compromised host(s) and botnets or command and controls.

In one embodiment, an online platform implementing an analytics framework for flux domain detection based on passive DNS traffic analysis includes applying a time series model based on a set of features by applying a set of prominent features that can address behavior changes in domain flux. Given that the amount of network data can be very large and flows in a fast speed, a horizontally scalable online system can be provided to facilitate large data throughput in near real-time as further described herein with respect to various embodiments.

In one embodiment, models for detecting known and/or unknown malicious DNS queries or anomalies (e.g., models that can be implemented and applied using an online platform) can be generated and trained offline using an offline platform as further described herein with respect to various embodiments. In an example implementation, a semi-supervised training framework for an offline platform can be provided to overcome the difficulties common in traditional supervised machine learning for network securities as further described herein with respect to various embodiments.

Domain flux using DNS services is one of the most active threats in computer and network security. As such, it is important to the network users if such a type of threat can be detected and mitigated on DNS transactions that are often the entry point for network connections. Since the early discovery of domain flux, domain flux behaviors have changed over the past decade to evade existing detection methods. Accordingly, various techniques are disclosed that can apply a new time series model with a set of features for flux domain detection. As further discussed below, an example of such a time series model applying a set of five features to detect flux domains has been analyzed and validated by an exemplary bulk set of passive DNS traffic in a real-time system to be effective in capturing old and new types of fast flux domains, including, for example, those that have a longer TTL and a lower number of resolved IP addresses.

These and various other examples for applying techniques for an online platform implementing an analytics framework for flux domain detection based on passive DNS traffic analysis are discussed below with respect to various embodiments.

Online Platform Architecture for Flux Domain Detection Based on Passive DNS Traffic Analysis FIG. 1 is a functional block diagram illustrating an architecture for providing an online platform implementing an analytics framework for DNS security based on passive DNS traffic analysis in accordance with some embodiments. In one embodiment, the framework for an online platform implementing an analytics framework for flux domain detection based on passive DNS traffic analysis includes a real-time processor cluster and, in some implementations, can optionally include a batch processor cluster (e.g., both of which can be scalable implementations). For example, the real-time processor cluster can be configured to handle Complex Event Processing (CEP) functions that process and analyze DNS stream data input, conduct real-time DNS stream data detection, extract features, and send raw and metadata into an observation cache. In complement to the real-time detection that may be bound by system resources, a batch processor cluster can optionally be provided to perform detection in a preset schedule against DNS data stored in the observation cache in a manner that can be cost effective. In an example implementation, the detection modules can be pluggable that are trained from an offline platform (e.g., an offline forensic platform), such as described further with respect to FIG. 2. In particular, the online platform can apply various models for flux domain detection as further described herein. In addition, these models can be retrained and refined in the online system as further described herein.

Referring to FIG. 1, the online platform implementing an analytics framework for DNS security based on passive DNS traffic analysis includes a real-time processor cluster 102 that receives a DNS data stream 104 via an input queue 106. For example, to detect flux domains in real-time, a horizontally scalable infrastructure that can facilitate real-time end-to-end processing can be provided. The time series model, as further discussed below, also can be implemented using a large and fast observation cache that can perform at web scale and at DNS speed. In one example implementation of the architecture of the online platform shown in FIG. 1, the architecture is composed of various open source components that are distributed and horizontally scalable as further discussed below.

In an example implementation, an agent can be configured to execute on one or more DNS servers or appliances to collect and periodically or in real-time send DNS queries to DNS stream 104, which is then provided in a queuing mechanism to collect and near real-time process that DNS data using the real-time process cluster. For example, the agent can be configured to send over a DNS stream as structured data using input queue 106 as shown in FIG. 1. In some cases, the DNS data streams can be partitioned per grid, such as for security and/or for policy/rules separation (e.g., mitigations can be configured per grid based on a per grid policy or some other level of granularity). Input queue 106 can be implemented using an open source message queue, such as the Apache Kafka high-throughput distributed messaging system that can be used as a persistent queue for input of the DNS message stream.

In one embodiment, real-time processor cluster 102 performs automated detection analysis for DNS security based on passive DNS traffic analysis using various techniques as described herein and provides DNS security detection results to a detection database 108 (e.g., and in some implementations, this activity is also performed by batch processor cluster 112, such as shown in FIG. 1). In an example implementation, real-time processor cluster 102 can be implemented using an open source platform for stream data processing, such as Apache Storm is a free and open source distributed real-time computation system (e.g., a distributed framework that allows applications to run in parallel, in which users can build topology networks in the application layer based on its API, in which each topology that is distributed and managed by the Storm network is for one or more applications) that can be implemented to perform real-time analytics based on models and various machine learning techniques as further described herein. In particular, real-time processor cluster 102 performs DNS security feature detection analysis (e.g., IP address changing over time, and/or other features, using caching techniques to calculate those features using a time series collection of DNS data).

In some implementations, an observation cache 110 is also provided that is in communication with real-time processor cluster 102, which can be used to provide a time series set of DNS data for applying models that utilize feature extraction techniques that involve using time series sets of DNS data. For example, time series data can be stored in observation cache 110, such as DNS data and meta data that includes features extracted or calculated from DNS queries. The observation cache can be implemented as a persistent, scalable, parallel computing cache (e.g., for storing time series data so that IP changes over time for a particular network domain can be detected, and/or for observing various other features associated with the time series collection of DNS data). In an example implementation, the observation cache can be implemented using an open source cache solution, such as the Memcached high-performance, distributed memory object caching system or HBase which is a persistent key-value store that has very fast insertion speed and built-in TTL and versioning features that can be used by the observation cache, and this can also be used for storing detection results for mitigation and reporting. Also, an optional batch processor cluster, shown as batch processor cluster 112, can be used for analysis of such time series data. In some implementations, real-time processor cluster 102 can be used for analysis of such time series data, and a batch processor cluster is not needed in such implementations.

This online detection framework can be implemented as an appliance (e.g., or using a set of appliances and/or computing servers) or as a cloud service, such as using Amazon Web Services or other cloud service providers. For example, the portion of the online platform as indicated by reference numeral 130 can be implemented on one or more computer servers or appliance devices or can be implemented as a cloud service, such as using Amazon Web Services or another cloud service provider for cloud-based computing and storage services.

As also shown in FIG. 1, DNS security detection results determined using the online platform 130 can also be communicated to a mitigation engine 114. In some implementations, the mitigation engine can be implemented within or integrated with the online platform. Mitigation engine 114 can determine and request various mitigation actions in response to the DNS security detection results based on a policy, such as a DNS security policy stored in a policy database 116. For example, mitigation engine 114 can configure a switch or router networking device 118 to filter (e.g., block or blacklist) a DNS that was determined to be associated with a bad network domain using real-time processor cluster 102. As another example, mitigation engine 114 can communicate with a DNS firewall 120 to identify one or more determined bad domains that were determined to be associated with a bad network domain using real-time processor cluster 102. In some implementations, mitigation engine 114 communicates with a DNS firewall (e.g., or other firewall device) 120 using a data feed, such as a Response Policy Zone (RPZ) data feed, via a publish/subscribe connection protocol, and/or various other communication mechanisms.

As an example use case scenario, assume that a new network domain is received in the DNS stream, such as XYZ.com (e.g., the new network domain can be specified in the form of a FQDN or an SLD). The first time that the XYZ.com domain is received by the processor cluster, that network domain can be cached in the observation cache (e.g., the network domain can be cached along with its resolved IP address). This particular XYZ.com domain can be received up to a threshold number of times (e.g., 100 times, 1,000 times, or some other threshold number of times) with different IP addresses associated with that same XYZ.com domain up to a threshold period of time (e.g., one hour, one day, one week, or some other threshold period of time). When a given domain's time series is classified to be malicious at any time during this caching process, then the XYZ.com domain is flagged and stored in the detection database (e.g., in this example, the XYZ.com can be identified as an illegitimate flux domain based on these and/or additional parameters observed during this time period of such captured DNS data). In some cases, whitelists and/or blacklists can be used to eliminate processing for network domains in the DNS data that have previously been determined to be good or bad. If bad network domains (e.g., bad domains) are detected, such as XYZ.com that was determined to be a bad domain in this example, the detection database can then communicate with the mitigation engine, which can be in communication with a policy data store (e.g., policies can be configured by/for an enterprise, by grid, and/or other policy configurations by grid, network, customer/entity, and/or other configurations and scope of applicability of rules configured in such policies). The mitigation engine can be configured based on the policy to perform various actions, such as the following: (1) add the XYZ.com domain to a blacklist, as the XYZ.com domain was determined to be a bad network domain in this example, and can also provide a feed back to the processor cluster and/or a DNS security service (e.g., a cloud-based DNS security service); (2) send the XYZ.com domain to a networking device, such as a router and/or a switch (e.g., physical or soft/virtual networking devices), which can then quarantine the host that was the source of the DNS query request for the XYZ.com domain, which was determined to be a bad network domain in this example; (3) send the XYZ.com domain to a DNS Firewall or other firewall (e.g., via response policy zone (RPZ) data feed to the DNS Firewall, via a connector model or publish/subscribe communication protocol/model, and/or using another communication mechanism). The above-described responses performed using the mitigation engine can be implemented to block the network traffic to the XYZ.com domain, which was determined to be a bad network domain in this example, and/or to quarantine the host that is attempting to communicate with this bad network domain (e.g., the host can be deemed to be infected, such as by a botnet and/or other malware, by the fact that the host attempted to communicate with the XYZ.com domain, which was determined to be a bad domain), or to automatically reconfigure routers and/or switches to automatically configure these network devices (e.g., using NETMRI, a security device controller using OpenFlow, or another mechanism that can perform such automated network device configurations) to quarantine the host source for the bad network domain. In some cases a benign classifier (e.g., generated by a research analyst to eliminate or reduce false positives) can be used to pre-process DNS stream data to determine whether a received DNS query in the DNS data stream is a valid DNS query so that it can be determined that there is no need to further process that DNS query using the online platform, such as for DNS queries for domains that are known to be associated with a CDN, NTP, or IRC services, or an enterprise host on the enterprise's network.

In one embodiment, an online platform implementing an analytics framework for flux domain detection based on passive DNS traffic analysis includes applying one or more models for flux domain detection. In an example embodiment, the online platform implementing an analytics framework for flux domain detection based on passive DNS traffic analysis can apply a time series model based on a set of features by applying a set of prominent features that can address behavior changes in domain flux. For example, a semi-supervised training framework can be provided to overcome the difficulties common in traditional supervised machine learning for network security. Given that the amount of network data can be very large and flows in a fast speed, a horizontally scalable online system, such as the online platform described above with respect to FIG. 1, can be provided to facilitate large data throughput in near real-time as described herein with respect to various embodiments.

Example Domain Flux Classification Models

As previously discussed with respect to prior approaches for flux domain detection, the most prominent characteristics that the DNS message of a flux domain may carry include a short TTL value, changing resolved IP addresses, and a large set of resolved IP addresses. However, many flux domain query responses have been observed that have very large TTL values and only one or a small set of resolved IP addresses. In such cases, it is not reliable to decide if a Fully Qualified Domain Name (FQDN) is using a fast flux technique or such a determination cannot be made simply based on each single DNS message.

Accordingly, in one embodiment, a time series model based on a set of features by applying a set of prominent features that can address behavior changes in domain flux is applied, such as using the online platform discussed above. Specifically, the proposed detection mechanism is based on a series of DNS messages associated with the underlying FQDN, as further discussed below.

Let $m^d(t,P)$ be one DNS message for the FQDN d, where t is the TTL value and $$p=\{p\}$$

is the set of resolved IP addresses from the DNS response. A set of consecutive DNS messages $$M^d\{m^d\}$$

is collected against the FQDN d to determine whether d is a flux domain or not. Therefore, we can define $$U=U_{m \in M^d} P$$

as the set of unique IP addresses from a set of consecutive messages M.

A flux domain tends to set a lower TTL value so that it will not stay in the DNS cache for a long time. The most obvious feature is the average TTL value $$T=\bar{t} \qquad (1)$$

for the set $M^d$. In addition, malware, such as C&C botnets and/or other malware, often tend to frequently change destinations to different IP addresses. In this example, we focus on IPv4 addresses, and as would be apparent to those of ordinary skill in the art, similar techniques can be applied to IPv6 addresses. The number of unique resolved IP addresses is another feature that is $$N=|U|. \qquad (2)$$

One of the challenges in detecting malicious flux domains is to distinguish many legitimate domains owned by, for example, CDN, load balancer venders, and NTP providers that are also providing a large number of changing destination IP addresses and short TTL values. These are referred to as legitimate flux users to contrast them with illegitimate flux domain users (e.g., malicious or suspicious flux domain users).

Compared to the malicious flux domain creators that acquire destination IP addresses from compromised systems randomly distributed everywhere and each has a very short lifetime, the resolved IP addresses provided by the legitimate flux users are generally distributed in a limited number of subnets and typically have good shares among the first one, two, and three octets of the IPv4 addresses. As such, we define an entropy feature E on the first two octets of the addresses of the set U. Entropy can provide a useful measure for the uncertainty of a random variable. For a set of elements S, let $D_S$ be the distribution of the unique elements, the entropy of set S is then defined as $$E_S=1-\Sigma[D_S \log(D_S)], \qquad (3)$$

which has a value between 0 and 1. This principle can also be applied to each DNS message. As a result, this provides the average entropy calculated on the first three octets of the addresses of the set of resolved IP addresses per each DNS message, which is denoted as $$F = \bar{e}_c, \quad (4)$$

This provides a good indicator of the target address neighborhood. An additional feature that is analyzed is the one to measure the loyalty of the resolved IP addresses, defined as $$L = \frac{\sum_{m \in M} |P| - |U|}{|M||U| - |U|}. \quad (5)$$

The L value will be higher if the target IP addresses are frequently reused, and vice versa. For legitimate flux domain users, because the resolved IP addresses come from a reliably managed pool, a destination IP is often reused within a region. On the other side, malicious flux domain users typically want to evade the detection systems and accommodate the availability fluctuation of compromised servers by changing resolved IP addresses frequently. As a result, the loyalty feature can provide prominent attributes that facilitate in lowering the false positive rate of this domain flux classification technique for malicious flux domain detection.

Now that we have defined the above equations as indicated by equation line references (1), (2), (3), (4), and (5), we will now discuss the domain flux classification that can be performed using these equations. After a thorough feature selection process on a large set of training dataset (e.g., performed using an offline platform, such as described below with respect to FIG. 2), we now focus on the feature vector (T, N, E, F, L), based on equations (1), (2), (3), (4), and (5), that will be used to build a time series model in classification of flux domains.

A trivial approach of supervised machine learning is to collect a set of samples with some size and get truth marked by security experts, and then partition the data for training and testing with various machine learning technologies. In the real world of network security, the ratio between the number of malicious messages and number of benign messages in DNS traffic is very small. As such, it is very costly to follow this trivial approach to have experts looking through an extremely large set of samples. On the other side, the traditional unsupervised methods will be less likely to provide good results on this highly biased network dataset. Therefore, a new semi-supervised machine learning technique is disclosed.

In one embodiment, a semi-supervised machine learning technique is provided that uses heuristics-based semi-supervised regression. For example, the heuristics-based semi-supervised regression approach can be applied in defining the classification system for detecting flux domain queries with a high confidence and, on the other side, this approach will not generate obvious false positives. In an example implementation, the regression starts from a relatively small capture rate and the coverage is extended to a degree where obvious false positive results start to be observed (e.g., 1%). In this example implementation, at each step, a security expert(s) will review the difference of the results which constructs the metrics of coverage and recall rates.

Figure 2:
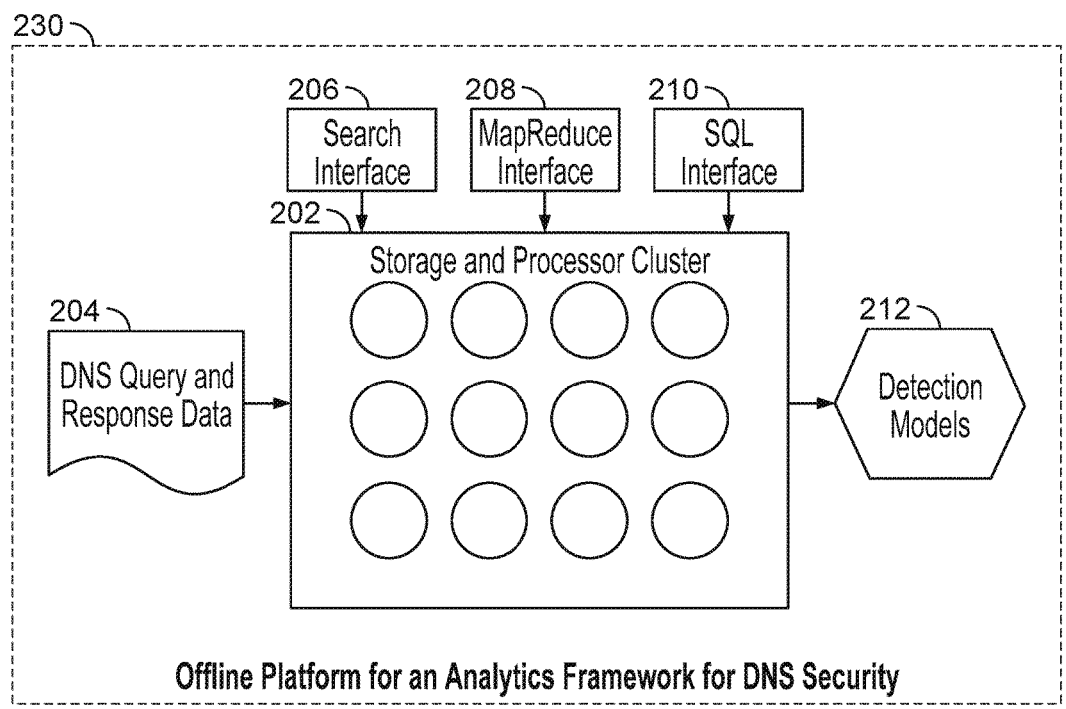
FIG. 2 is a functional block diagram illustrating an architecture for providing an offline platform implementing an analytics framework for DNS security based on passive DNS traffic analysis in accordance with some embodiments.

Offline Platform Architecture for Flux Domain Detection Based on Passive DNS Traffic Analysis FIG. 2 is a functional block diagram illustrating an architecture for providing an offline platform implementing an analytics framework for DNS security based on passive DNS traffic analysis in accordance with some embodiments. For example, the offline platform can be provided to perform various offline forensics of bulk DNS query and response data (e.g., analysis of DNS logs).

As shown in FIG. 2, an architecture of an offline platform 230 is provided for implementing an analytics framework for DNS security based on passive DNS traffic analysis. For example, the offline forensic platform can be used to collect DNS data and support machine learning processes that can be used to generate various detection models based on historical DNS data collections. Given a sizable network, the DNS volume is typically very large while the number of anomalous queries is relatively small. In order to capture a sufficient number of samples for the offline forensic platform, it is generally desirable to collect and store a significant amount of historical DNS data with a full set of attributes from DNS queries and DNS responses. The challenge is not only in the effectiveness of cost and performance in such storage, but also in the capacity and flexibility of computational power for processing such a large amount of data in parallel. Accordingly, in some implementations, the offline forensic platform that is disclosed can include Hadoop, HBase, Impala, Hive, Solr and various other Hadoop ecosystems from Apache open source projects. For example, the storage and processor cluster can be built on a multi-node Hadoop system (e.g., a nine-node Hadoop system). The offline forensic platform can provide the characteristics and functionalities that are used for big data advanced analytics through, for example, three types of interfaces, including search, Structured Query Language (SQL), and MapReduce. Because all of the components inherit the properties of scalability and fault tolerance, this system is scalable to accommodate data growth and fault tolerable for high availability. Unlike a typical Relational DataBase Management System (RDBMS), the storage can be schema free to facilitate the data changes and diversity though it supports SQL queries for which schema can be defined in the query time rather than in the storing time. The full set of attributes from DNS query and response can be included in the modeling.

Referring to FIG. 2, DNS query and response data 204 is provided as input to storage and processor cluster 202. For example, the DNS query and response data can be a source of bulk DNS queries, such as from ISC or another DNS data source, such as from the local DNS appliances of an entity's network.

As also shown, storage and processor cluster 202 can include various interfaces, including a search interface 206, which can be implemented using an open source search platform (e.g., Apache Lucene or Apache SOLR), a MapReduce interface 208 (e.g., implemented using Hadoop MapReduce), and a database/SQL Interface 210 (e.g., implemented using Apache Hive or Cloudera Impala), any of which can feed into detection models 212, such as example DNS detection models disclosed herein. In particular, any of these interfaces can be used as interfaces for various machine learning and feature analysis techniques. Example feature analysis techniques include entropy feature extraction, distribution analysis, feature selection, dimension reduction, and various other feature analysis techniques. Example machine learning techniques include k-means clustering, Naïve Bayes classification, logistic regression, classification tree, and various other machine learning techniques. In some implementations, the offline platform can facilitate this machine learning process and its iterations for improving accuracy.

In an example implementation, the offline platform can be used to develop one or more DNS detection models, such as a flux domain detection model. For example, DNS detection models can be trained using these machine learning techniques. In some cases, the offline platform can be used to provide new DNS detection models and/or to re-train/modify existing DNS detection models to improve such DNS detection models that can then be provided to the online platform described above with respect to FIG. 1 to apply the new or improved DNS detection models.

In one embodiment, storage and processor cluster 202 is a scalable, parallel computing (e.g., using a set of servers, such as using a computing service such as Amazon Web Services) implementation. Specifically, storage and processor cluster 202 can be implemented using a Hadoop cluster for storing DNS structured query data. More specifically, DNS query and response data can be modeled (e.g., based on standard requirements for DNS protocol, such as Internet Engineering Task Force (IETF) Request for Comments (RFC) requirements for the DNS protocol) in the Hadoop cluster. As a result, structured information can be stored to define attributes based on RFCs that define DNS protocol to optimize the search, query, and MapReduce interface access to provide optimal performance for DNS using various machine learning techniques.

As an example use case scenario, a baseline can be provided for the system with an input of an initial DNS data set that is analyzed using the offline analysis platform shown in FIG. 2. In this example, the initial DNS data set can include a set of DNS data collected over a period of time that was collected from one or more sources, such as from Farsight Security's Internet Systems Consortium (ISC)/Security Information Exchange (SIE) with millions or even billions of DNS messages that can be used as the initial DNS data (e.g., such DNS data is collected through ISC/SIE passive DNS technology from more than 80 contributors distributed worldwide). In some cases, the baseline can illustrate a detection accuracy with various defined metrics. Also, the initial DNS data can be analyzed to provide insights about the fast flux malware and its behavior(s). In some implementations, the offline platform can be used for offline data analysis and semi-supervised training using various techniques described herein. A MapReduce job can be created and executed to simulate online detection including feature extraction, time series modeling, and flux detection.

For example, using an example initial bulk DNS data set, the following results were shown using the above-described offline platform and techniques. The result shows that, using a collection of 200 days of DNS data, and in this DNS data set example such DNS data was collected from November 2012 to June 2013, there are 10 million DNS messages for 906 unique domains classified as flux domain. Furthermore, these flux domains come from 527 second level domains and the number of unique resolved IPs reaches a half million. In this example, each of the flux domains were manually reviewed and cross checks were performed. Three of the detected flux domains, identified as olendi.com, lodgelocker.com, and loenbun.com, are less popular sites according to the Alexa ranking of web sites. The other five sites, identified as dashjr.org, sipa.be, bluematt.me, litecoinpool.org, and xurious.com, appear to be peer-to-peer seed trackers. Interestingly, the average TTL value of these detected queries can be as high as 14 hours. That means a flux domain can slowly change its target IP address to hide itself from most detection algorithms. On average, 23,892 DNS messages are detected to be of flux domain per day or the rate is 24 every one million messages.

Assuming all flux domains with the same SLD are created by the same attacker, listed below are the top ten Autonomous System (AS) networks by the number of attackers as shown in Table 1.

TABLE 1

Top 10 AS Networks Compromised by Flux Domains

| Number of Flux Domain SLD | Number of Queries | AS Number (ASN) | ASN Name |
|---|---|---|---|
| 489 | 2,109,222 | 701 | UUNET - MCI Communications Services, Inc. d/b/a Verizon Business |
| 475 | 1,151,573 | 20,115 | CHARTER-NET-HKY-NC - Charter Communications |
| 453 | 542,027 | 20,845 | DIGICABLE DIGI Ltd. |
| 452 | 627,966 | 9,121 | TTNET Turk Telekomunikasyon Anonim Sirketi |
| 444 | 710,814 | 6,830 | LGI-UPC Liberty Global Operations B.V. |
| 438 | 922,094 | 812 | ROGERS-CABLE - Rogers Cable Communications Inc. |
| 437 | 509,095 | 33,491 | COMCAST-33491 - Comcast Cable Communications, Inc. |
| 429 | 272,742 | 20,001 | ROADRUNNER-WEST - Time Warner Cable Internet LLC |
| 428 | 418,868 | 10,796 | SCRR-10796 - Time Warner Cable Internet LLC |
| 414 | 303,796 | 7,015 | COMCAST-7015 - Comcast Cable Communications Holdings, Inc |

Figure 3:
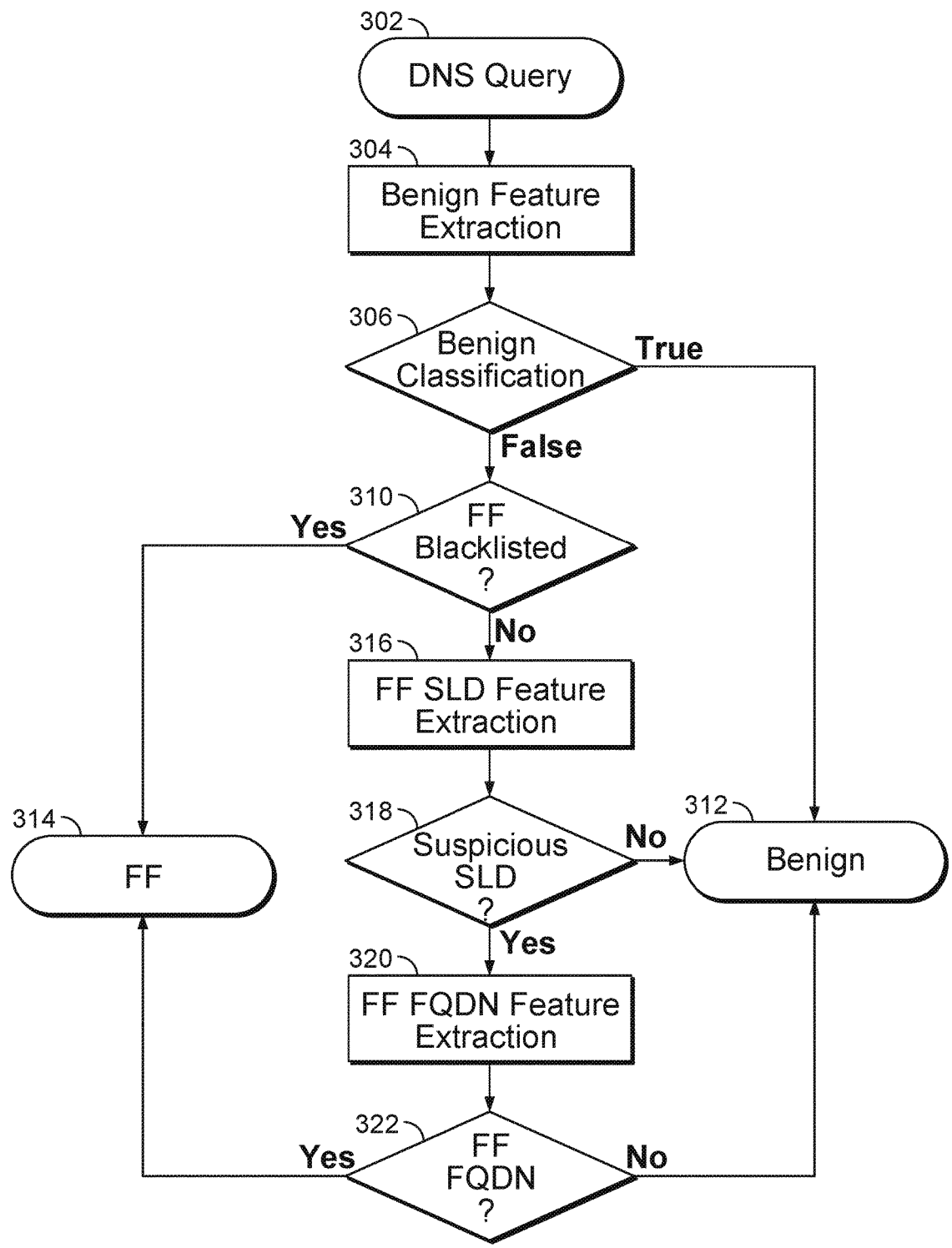
FIG. 3 is a flow diagram illustrating a process for fast flux classification in accordance with some embodiments.

Real-Time Detection System for Flux Domain Detection Based on Passive DNS Traffic Analysis FIG. 3 is a flow diagram illustrating a process for fast flux classification in accordance with some embodiments. For example, the process shown in FIG. 3 can be performed using the online platform discussed above with respect to FIG. 1.

Referring to FIG. 3, at 302, a DNS query is received for processing and classification. At 304, a benign feature extraction is performed. With the increase of network complexity and the number of devices, it is reasonable to expect a throughput up to, for example, one million DNS messages per second at peak time within a large network. On the other side, the number of unique FQDNs to be requested can be around, for example, 200 million and this number continues to increase. As such, it is desirable for the real-time detection system to be able to process DNS stream data with both volume and velocity. In order to reduce the workload on flux domain detection, a benign classification is performed as a processing stage that can be used to drop DNS messages that are determined to not be malicious with high confidence. For example, the benign classification can be implemented as a white list (e.g., a listing of known good network domains).

At 306, if the DNS query is determined to be benign, then the process is completed at 312 with the benign classification for the DNS query. Otherwise, processing proceeds to 310 to determine whether the DNS query is on a fast flux (FF) blacklist (e.g., a listing of known bad network domains that were previously identified/determined to be associated with malicious flux domains). If so, then the process is completed at 314 with the fast flux (FF) classification for the DNS query. Otherwise, processing proceeds to 316 to perform fast flux (FF) Second Level Domain (SLD) feature extraction.

At 318, whether the DNS query is a suspicious FF SLD is determined. If not, then the process is completed at 312 with the benign classification for the DNS query. Otherwise, processing proceeds to 320 to perform fast flux (FF) Fully Qualified Domain Name (FQDN) feature extraction.

At 322, whether the DNS query is a suspicious FF FQDN is determined. If not, then the process is completed at 312 with the benign classification for the DNS query. If so, then the process is completed at 314 with the fast flux (FF) classification for the DNS query.

Figure 4:
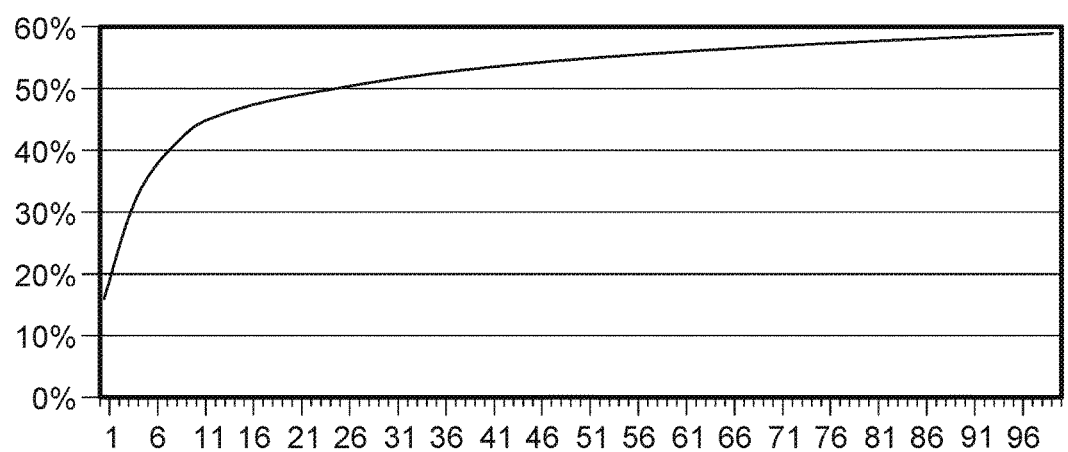
FIG. 4 shows an example of the coverage of DNS queries by a listing of the top 100 Second Level Domains (SLDs).

In an example implementation, a component of the benign classifier is a whitelist of, for example, 80 items that are carefully selected from the top 100 second level domains or SLDs. FIG. 4 shows an example of the coverage of DNS queries by a listing of the top 100 Second Level Domains (SLDs). Effectively, in this example, 60% of the queries can be safely (e.g., conservatively) dropped from fast flux classification (e.g., at the benign classification stage at 306 as shown in FIG. 3 as discussed above).

In addition, queries $$\{m_d(t,P):t>86400 \text{ or } |P|1 \text{ and } E_p<0.5\},$$

where $E_p$ is the entropy that is calculated on the first two octets of the resolved IP address set P, can be classified as benign with confidence. However, when a DNS message is classified as not a fast flux (FF) domain, that does not mean that the underlying FQDN d is benign. Rather, the underlying FQDN will be classified further when the time series is updated by the new messages (e.g., DNS stream data associated with that FQDN).

Asynchronous Detection Mode for the Online Platform

Figure 5:
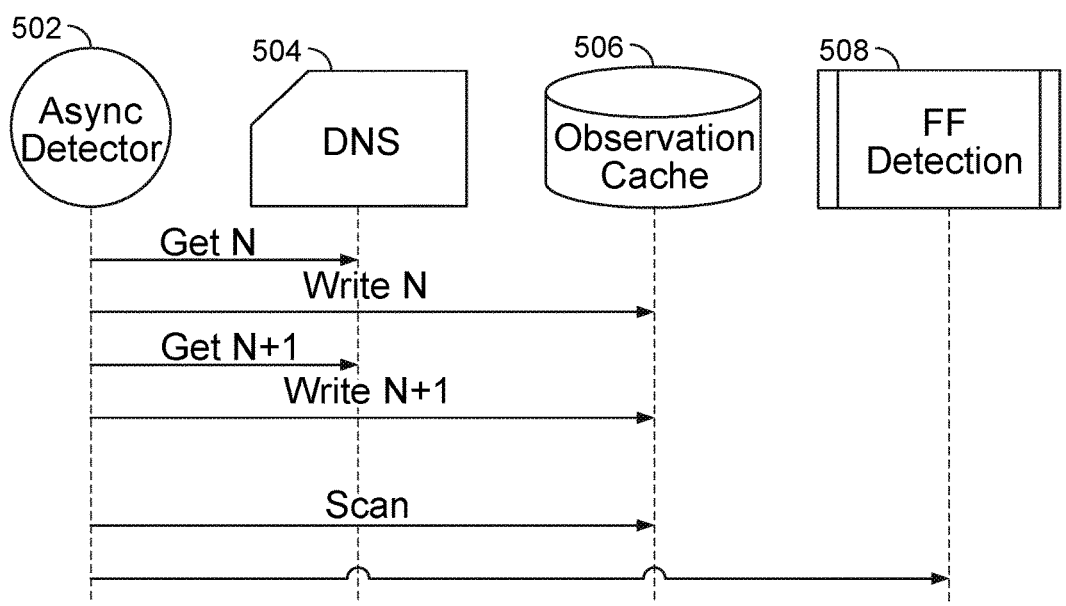
FIG. 5 is a transaction diagram illustrating an asynchronous detection mode for the online platform for DNS security based on passive DNS traffic analysis in accordance with some embodiments.

FIG. 5 is a transaction diagram illustrating an asynchronous detection mode for the online platform for DNS security based on passive DNS traffic analysis in accordance with some embodiments. For example, the exemplary transaction process shown in FIG. 5 can be performed using the online platform discussed above with respect to FIG. 1.

In particular, given the large throughput of DNS traffic, to be cost effective, an asynchronous detection mode for the online platform is provided. In an example implementation, HBase is used to provide a key-value store that is built based on Google's BigTable publication, which is designed to have near in-memory insertion speed. Similar to most database architectures, its random read speed is slower than its write speed. The system resource requirement is generally linearly proportional to the data velocity. In a synchronous detection mode, a detection process on a subject FQDN that includes time series data retrieval, feature extraction, and classification will be triggered whenever there is an update by a new DNS message. To some extent, the synchronous detection mode will hit the disk input/output (I/O) bound given a limited hardware resource. To overcome this problem, online detection is performed in an asynchronous mode to avoid frequent random reads. Therefore, the detection can be done in batch mode by scanning with a MapReduce job that is scheduled for, for example, every ten minutes. The process is illustrated in FIG. 5 as further discussed below.

Referring to FIG. 5, at 502, an async detector detects when a DNS message is received from a DNS data source 504. For example, the DNS stream can be DNS messages that are received from DNS appliances that execute an agent to provide such DNS stream data to the online platform. As shown, for each new DNS message, a Get N operation is performed and a Write N operation is performed. The write operation is performed to write the DNS message to the observation cache 506, which can be used to collect time series DNS data as discussed above with respect to, for example, FIG. 1. As each new DNS message is received, another Get N+1 operation and Write N+1 operation are performed, respectively. A scan operation and FF detection can be performed as shown at 508, such as similarly described above.

Online Detection Performance

As an example, performance benchmarking can be executed on a cluster of nine systems in which each is equipped with, in this example implementation, a CPU of 2.9 GHz and four cores, 16 GB memory, and two 1 TB hard disks. The cluster can be linked with a 1 Gbps network and can be loaded with CentOS 6.4, Hadoop 2.0, HBase 0.94, Storm 0.8, and Kafka 0.7. In this example implementation, the cluster can reach a throughput of processing up to 2.8 million DNS messages per second. As would be apparent to one of ordinary skill in the art, this performance can be further tuned and optimized using different hardware/software combinations and/or additional hardware for processing.

Detection Latency

Figure 6:
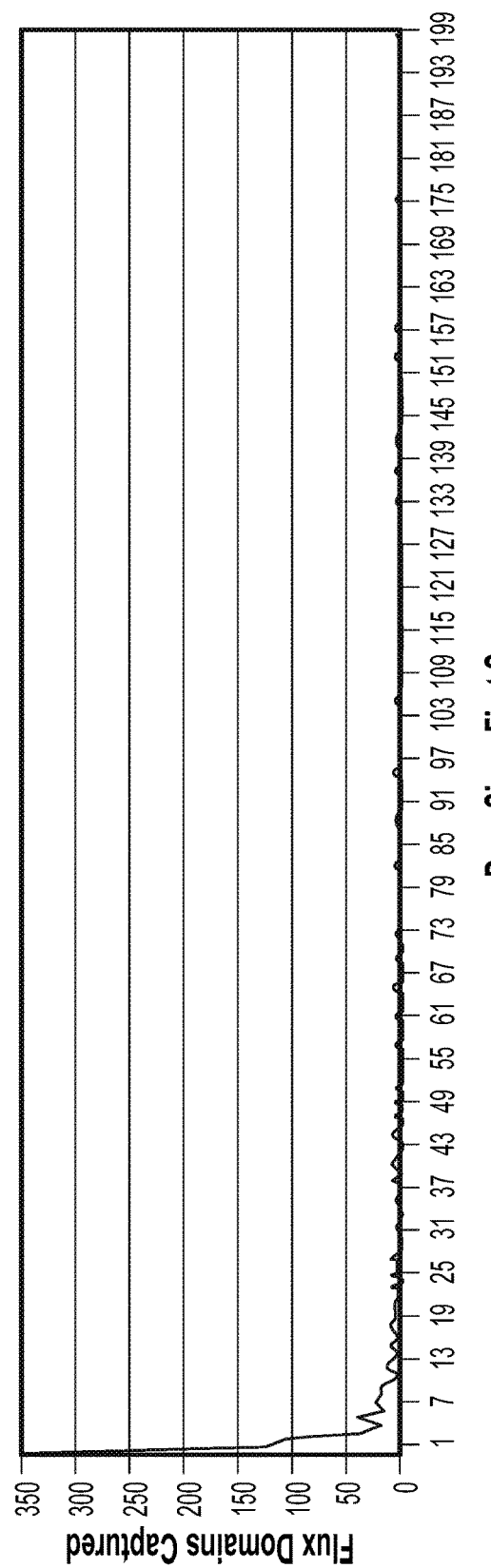
FIG. 6 is a diagram illustrating an example of observed detection latency by time in accordance with some embodiments.

FIG. 6 is a diagram illustrating an example of observed detection latency by time in accordance with some embodiments. In particular, FIG. 6 illustrates detection latency defined by time. In terms of time, most of the flux domains can be detected using the online platform (e.g., implementing a time series model as described herein) in less than a week as shown in FIG. 6.

As discussed above, detecting a flux domain based on a single DNS message is often not feasible or accurate. The presented time series model is based on a running history of the DNS messages. Therefore, there is a tradeoff between detection latency and accuracy. On the other side, the latency depends on the data feed rate. In particular, detection latency can be defined in two ways, by time and by a number of queries between first seen and capture in an example DNS data stream, as shown with respect to FIGS. 6 and 7, respectively.

Figure 7:
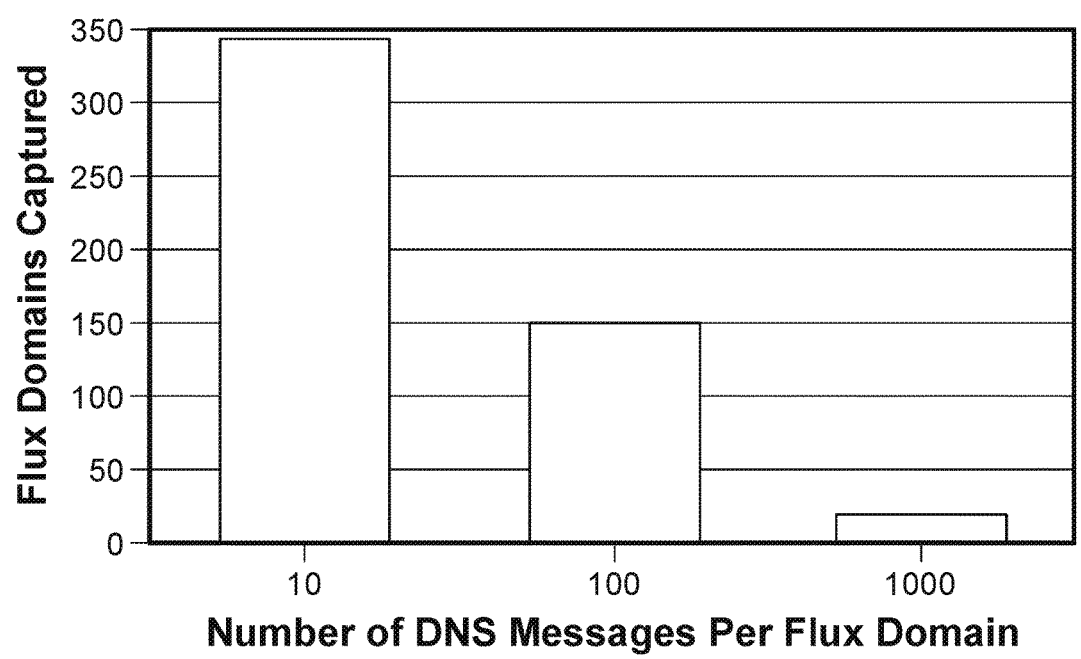
FIG. 7 is a diagram illustrating an example of observed detection latency by a number of DNS messages in accordance with some embodiments.

FIG. 7 is a diagram illustrating an example of observed detection latency by a number of DNS messages in accordance with some embodiments. In particular, FIG. 7 illustrates detection latency defined by a number of queries between first seen and capture in an example DNS data stream. On the other side most of the flux domains can be captured before seeing the $100^{th}$ DNS query for the underlying domain name as shown in FIG. 7. For example, based on this data, a threshold number of DNS queries for capture before performing the FQDN FF detection based on feature extraction can be set to equal 100 or some other value that corresponds to an observed critical (first minimum) point in such detection latency by a number of DNS messages data sets.

Generally, both metrics indicate that a small portion of flux domains will take a very long time or a large number of DNS messages to be captured. That may be due to their low activity or because those attacks act more like a normal DNS message in a short period of time. The evidence for making an accurate decision on them grows slowly. Given a flux domain, the actual latency is determined by the interval set in the online system (e.g., ten minutes) and the DNS traffic on the subject domain to collect enough resolved IP addresses for calculating loyalty and entropy features using the above-described flux domain detection model. Therefore, for the most active flux threats, they can be captured in less than 10 minutes using the above-described online platform applying the above-described flux domain detection model. In contrast, other approaches have reported a minimum detection latency of 30 hours and claimed that it is days or weeks earlier than other sources publically available (see Perdisci, R., Corona, I., and Giacinto, G.: Early Detection of Malicious Flux Networks via Large-Scale Passive DNS Traffic Analysis. In: IEEE Transactions on Dependable and Secure Computing, vol. 9, no. 5, pp. 714-726 (2012)). With the use of the techniques disclosed herein, detection latency can be proportionally shortened when the data feed rate increases.

Flux Domain Life Span

Figure 8:
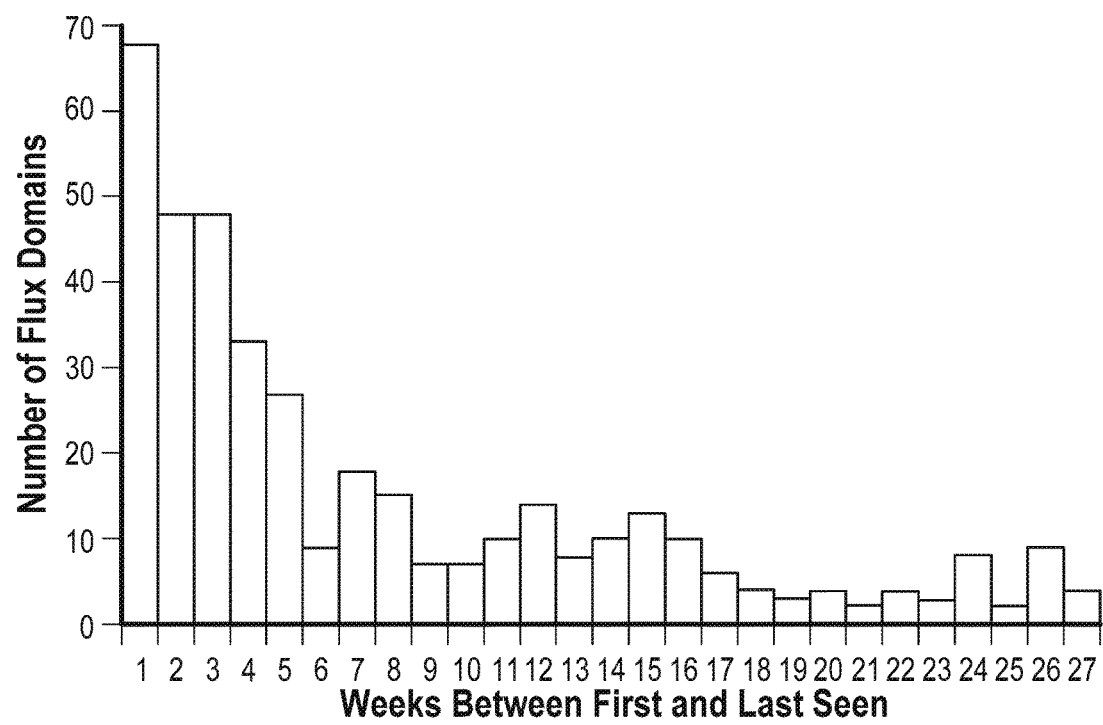
FIG. 8 is a diagram illustrating an example of observed flux domain life span in accordance with some embodiments.

FIG. 8 is a diagram illustrating an example of observed flux domain life span in accordance with some embodiments. With a basic assumption that a flux domain will be active, once it appears, and until it gets removed, the time between first seen and last seen is counted as an estimate of a life span of a flux domain. Although some flux domains may last longer than six months as shown in FIG. 8, most of the flux domains disappear after one month. The short life span of the flux domains generally indicates that blacklisting techniques are less effective and demonstrates a need for online analytical detection platforms such as described herein that can detect and block new flux domains in a real-time manner (e.g., at or near real-time).

Effectiveness of Detection Algorithm

Figure 9:
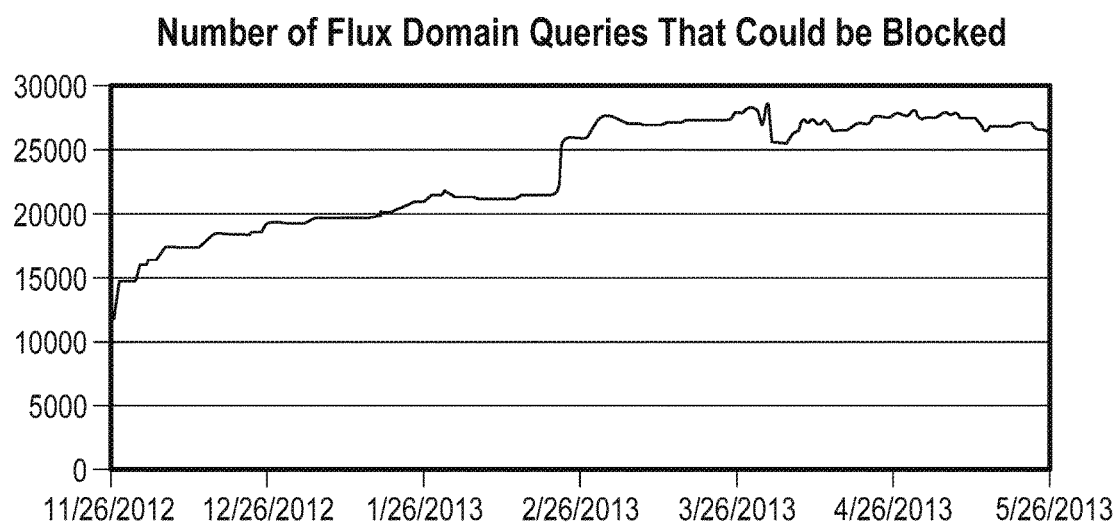
FIG. 9 is a diagram illustrating an effectiveness of an example flux domain detection algorithm in accordance with some embodiments.

FIG. 9 is a diagram illustrating an effectiveness of an example flux domain detection algorithm in accordance with some embodiments. In particular, FIG. 9 illustrates an effectiveness of the above-discussed example flux domain detection algorithm that is, for example, discussed in detail in the "Example Domain Flux Classification Models" section above. This effectiveness metric generally illustrates how many fast flux queries can be detected (e.g., and could be blocked or other mitigation actions performed, using the above-described mitigation engine) using the online platform described herein. In this example, the example DNS data set is for a period of time beginning on the date of Nov. 26, 2012 and through the date May 26, 2013 (e.g., using a set of bulk DNS data for that period of time retroactively provided as input to the online platform for flux domain detection). As shown in FIG. 9, the system can detect (e.g., and as such, could block) up to 28,000 fast flux related DNS queries out of 1.8 billion DNS queries on each given day.

Example Flux Domain Detection Process Embodiments

Figure 10:
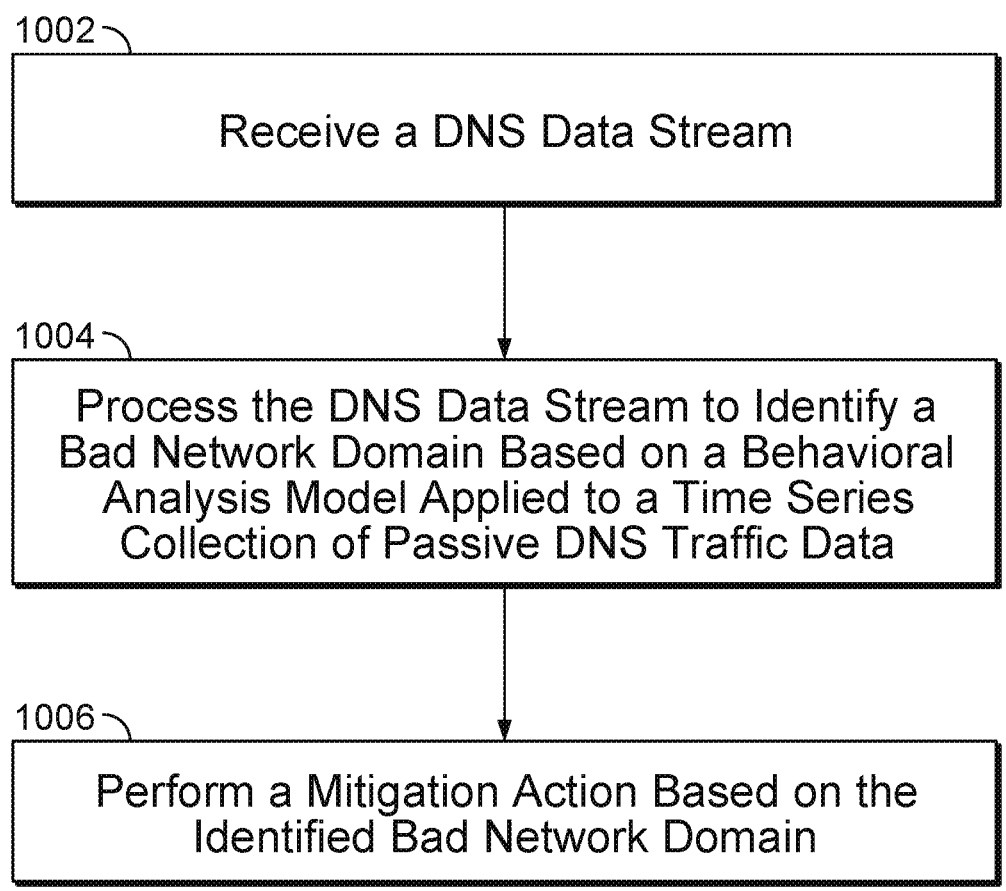
FIG. 10 is a flow diagram illustrating a process for providing an online platform implementing an analytics framework for DNS security based on passive DNS traffic analysis in accordance with some embodiments.

FIG. 10 is a flow diagram illustrating a process for providing an online platform implementing an analytics framework for DNS security based on passive DNS traffic analysis in accordance with some embodiments.

At 1002, a DNS data stream is received. For example, the DNS data stream can include DNS query and DNS response data.

At 1004, the DNS data stream is processed to identify a bad network domain based on a behavioral analysis model applied to a time series collection of passive DNS traffic data. For example, the bad network domain can be determined to be associated with a flux domain. In some cases, the bad network domain can be associated with a Fully Qualified Domain Name (FQDN).

At 1006, a mitigation action based on the identified bad network domain is performed. For example, the mitigation action can include a configuration action and/or a filtering action (e.g., block or drop packets to/from the bad network domain).

Figure 11:
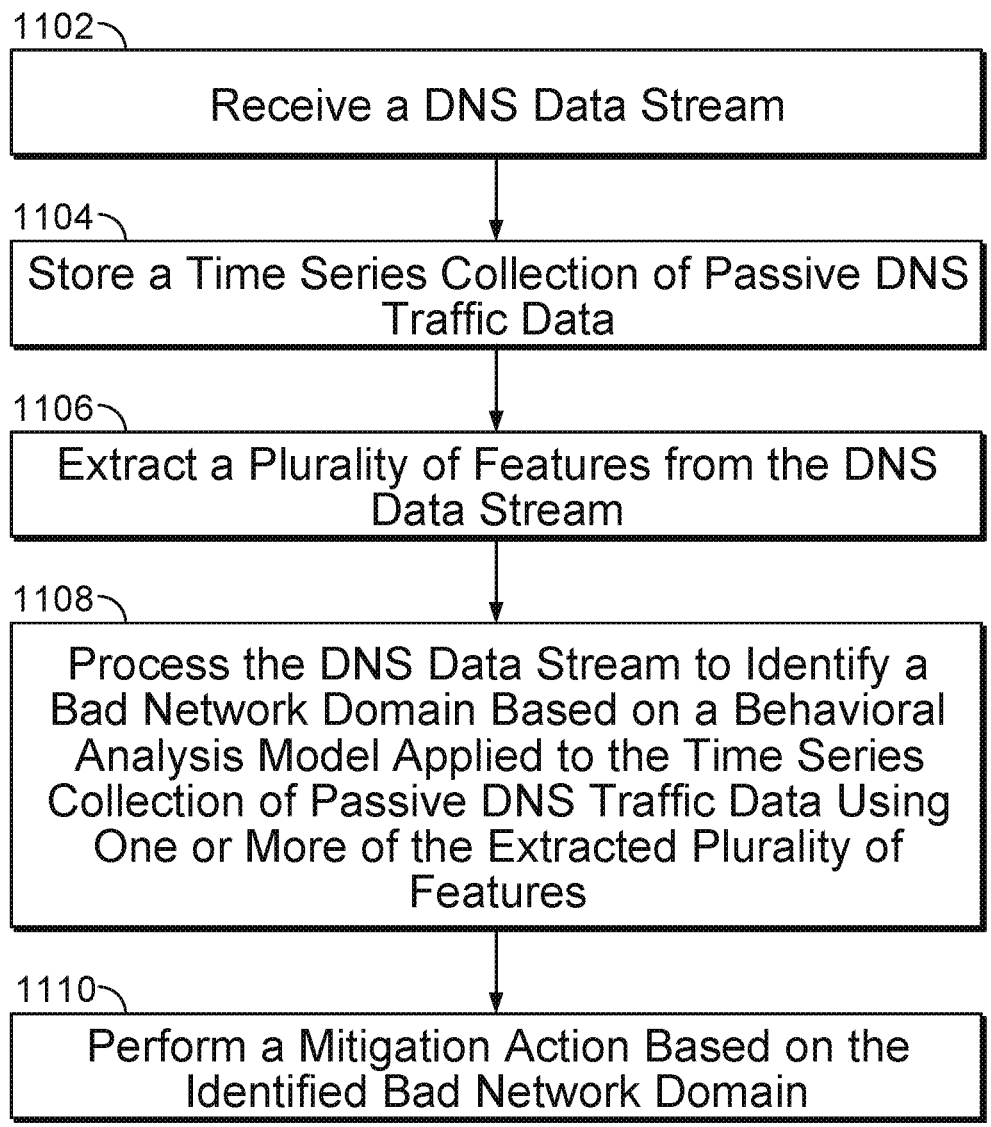
FIG. 11 is another flow diagram illustrating a process for providing an online platform implementing an analytics framework for DNS security based on passive DNS traffic analysis in accordance with some embodiments.

FIG. 11 is another flow diagram illustrating a process for providing an online platform implementing an analytics framework for DNS security based on passive DNS traffic analysis in accordance with some embodiments.

At 1102, a DNS data stream is received. For example, the DNS data stream can include DNS query and DNS response data.

At 1104, a time series collection of passive DNS traffic data is stored. For example, the time series collection of passive DNS traffic data can be stored in an observation cache. In some implementations, a threshold number of instances of DNS queries with respect to a particular network domain received within a predetermined period of time is used as a trigger for performing further flux domain analysis of that particular DNS domain (e.g., based on extracted features).

At 1106, a plurality of features are extracted from the DNS data stream. For example, one or more features, such as source IP address, source host, network domain name (e.g., SLD and/or FQDN), TTL value, and/or other features, can be extracted from the DNS data stream.

At 1108, the DNS data stream is processed to identify a bad network domain based on a behavioral analysis model applied to a time series collection of passive DNS traffic data using the one or more of the extracted plurality of features. For example, the bad network domain can be determined to be associated with a flux domain (e.g., which is not a legitimate flux domain). In some cases, the bad network domain can be associated with a Fully Qualified Domain Name (FQDN).

At 1110, a mitigation action based on the identified bad network domain is performed. For example, the mitigation action can include configuring a network device (e.g., a switch or router, implemented as a physical or virtual switch/router) to quarantine the infected host and/or block access to the bad network domain, using network access control or other mechanisms to quarantine the infected host and/or block access to the bad network domain, configuring a security device controller using Open Flow techniques to configure a network device (e.g., a switch or router, implemented as a physical or virtual switch/router) to quarantine the infected host and/or block access to the bad network domain, and/or to implement other configuration/programming techniques such as via API or publish/subscribe mechanisms to configure a network device (e.g., a switch or router, implemented as a physical or virtual switch/router) to quarantine the infected host and/or block access to the bad network domain.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for an online platform implementing an analytics framework for domain detection on passive DNS traffic, comprising:
   a processor configured to:
      receive a DNS data stream;
      process the DNS data stream to identify a bad network domain based on a behavioral analysis model applied to a time series collection of passive DNS traffic data, comprising to:
         determine that a domain associated with a DNS query is not found on a fast flux blacklist, the fast flux blacklist including a listing of known bad network domains that were previously identified
or determined to be associated with malicious flux
domains; and determine whether the domain is the bad network
domain based on a loyalty value and an average
entropy of a set of unique resolved IP addresses
for a DNS message for the domain, wherein the
determining of whether the domain is the bad
network domain is based on the determination that
the domain associated with the DNS query is not
found on the fast flux blacklist, wherein the average entropy is determined based on a distribution
of the first three octets of addresses of the set of
unique resolved IP addresses for the DNS message, and wherein the loyalty value is determined
based at least in part on:

a set of resolved IP addresses from the passive
DNS traffic data;

a set of consecutive DNS messages collected
against a fully qualified domain name (FQDN)
from the passive DNS traffic data; and a number of unique resolved IP addresses of the
set of unique resolved IP addresses for the DNS
message; and perform a mitigation action based on the identified bad
network domain; and a memory coupled to the processor and configured to
provide the processor with instructions.

2. The system recited in claim 1, wherein the DNS data stream includes the DNS query and DNS response data.

3. The system recited in claim 1, wherein the bad network domain is associated with the Fully Qualified Domain Name (FQDN).

4. The system recited in claim 1, wherein the processor is further configured to:
determine a host is infected based on detecting a DNS query request to the bad network domain from the host.

5. The system recited in claim 1, wherein the processor is further configured to:
determine a host is infected based on detecting a DNS query request to the bad network domain from the host; and
perform another mitigation action based on the determined infected host.

6. The system recited in claim 1, wherein the mitigation action includes one or more of the following:
generate a firewall rule based on the bad network domain;
configure a network device to block network communications with the bad network domain; and
quarantine an infected host, wherein the infected host is determined to be infected based on an association with the bad network domain.

7. The system recited in claim 1, wherein the processor is further configured to:
identify a source IP address, a source host, or an attempt to query the bad network domain.

8. The system recited in claim 1, wherein the processor is further configured to:
store the time series collection of passive DNS traffic data in an observation cache.

9. The system recited in claim 1, wherein the processor is further configured to:
receive DNS data that is collected from an agent executed on a DNS appliance.

10. The system recited in claim 1, wherein the processor is further configured to:

extract a plurality of features from the DNS data stream to determine whether a network domain is associated with a fast flux based on the extracted plurality of features.

11. A method of an online platform implementing an analytics framework for domain detection on passive DNS traffic, comprising:
receiving a DNS data stream;
processing the DNS data stream to identify a bad network domain based on a behavioral analysis model applied to a time series collection of passive DNS traffic data, comprising:
determining that a domain associated with a DNS query is not found on a fast flux blacklist, the fast flux blacklist including a listing of known bad network domains that were previously identified or determined to be associated with malicious flux domains; and
determining whether the domain is the bad network domain based on a loyalty value and a loyalty value associated with the domain, wherein the determining of whether the domain is the bad network domain is based on the determination that the domain associated with the DNS query is not found on the fast flux blacklist, wherein the loyalty value is determined based on an average entropy of a set of unique resolved IP addresses for a DNS message for the domain, wherein the average entropy is determined based on a distribution of the first three octets of addresses of the set of unique resolved IP addresses for the DNS message, and wherein the loyalty value is determined based at least in part on:
a set of resolved IP addresses from the passive DNS traffic data;
a set of consecutive DNS messages collected against a fully qualified domain name (FQDN) from the passive DNS traffic data; and
a number of unique resolved IP addresses of the set of unique resolved IP addresses for the DNS message; and
performing a mitigation action based on the identified bad network domain.

12. The method of claim 11, wherein the DNS data stream includes the DNS query and DNS response data.

13. The method of claim 11, wherein the bad network domain is associated with the Fully Qualified Domain Name (FQDN).

14. The method of claim 11, further comprising:
determining a host is infected based on detecting a DNS query request to the bad network domain from the host.

15. The method of claim 11, further comprising:
determining a host is infected based on detecting a DNS query request to the bad network domain from the host; and
performing another mitigation action based on the determined infected host.

16. A computer program product for an online platform implementing an analytics framework for domain detection on passive DNS traffic, the computer program product being embodied in a tangible non-transitory computer readable storage medium and comprising computer instructions for:
receiving a DNS data stream;
processing the DNS data stream to identify a bad network domain based on a behavioral analysis model applied to a time series collection of passive DNS traffic data, comprising:

determining that a domain associated with a DNS query is not found on a fast flux blacklist, the fast flux blacklist including a listing of known bad network domains that were previously identified or determined to be associated with malicious flux domains; and determining whether the domain is the bad network domain based on a loyalty value and an average entropy of a set of unique resolved IP addresses for a DNS message for the domain, wherein the determining of whether the domain is the bad network domain is based on the determination that the domain associated with the DNS query is not found on the fast flux blacklist, wherein the average entropy is determined based on a distribution of the first three octets of addresses of the set of unique resolved IP addresses for the DNS message, and wherein the loyalty value is determined based at least in part on:

a set of resolved IP addresses from the passive DNS traffic data;

a set of consecutive DNS messages collected against a fully qualified domain name (FQDN) from the passive DNS traffic data; and a number of unique resolved IP addresses of the set of unique resolved IP addresses for the DNS message; and performing a mitigation action based on the identified bad network domain.

17. The computer program product recited in claim 16, wherein the DNS data stream includes the DNS query and DNS response data.

18. The computer program product recited in claim 16, wherein the bad network domain is associated with the Fully Qualified Domain Name (FQDN).

19. The computer program product recited in claim 16, further comprising computer instructions for:
determining a host is infected based on detecting a DNS query request to the bad network domain from the host.

20. The computer program product recited in claim 16, further comprising computer instructions for:
determining a host is infected based on detecting a DNS query request to the bad network domain from the host; and
performing another mitigation action based on the determined infected host.

* * * * *

UNITED STATES PATENT AND TRADEMARK OFFICE
CERTIFICATE OF CORRECTION

PATENT NO.        : 10,425,383 B2
APPLICATION NO.   : 15/696023
DATED             : September 24, 2019
INVENTOR(S)       : Bin Yu, Les Smith and Mark Threefoot Page 1 of 1

It is certified that error appears in the above-identified patent and that said Letters Patent is hereby corrected as shown below:

On the Title Page

In page 2, item (56), references cited, U.S. patent documents, Column 1, Cite no. 4, US2010/0235915 A1, delete "Merron" and insert --Menon--, therefor.

Signed and Sealed this
Third Day of March, 2020

Andrei Iancu
*Director of the United States Patent and Trademark Office*